Aug. 4, 1959
F. DIDSZUNS
2,897,931
CLUTCH WITH MAGNETIC POWDER MIXTURE FOR
FORCE TRANSMITTING DEVICES
Filed Dec. 27, 1954
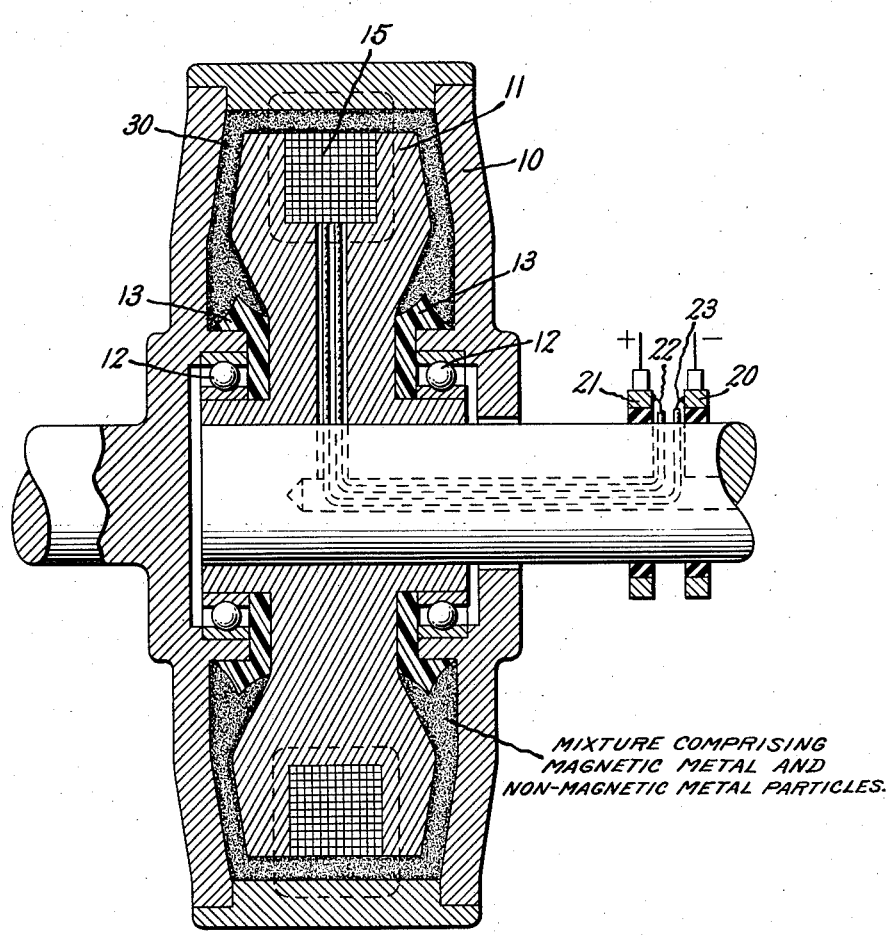
Inventor:
Fritz Didszuns,
by *Claude H. Mitts*
His Attorney.

2,897,931

CLUTCH WITH MAGNETIC POWDER MIXTURE FOR FORCE TRANSMITTING DEVICES

Fritz Didszuns, Schenectady, N.Y., assignor to General Electric Company, a corporation of New York Application December 27, 1954, Serial No. 477,665

2 Claims. (Cl. 192—21.5)

This invention relates to magnetic powders of magnetically variable shear strength as used in magnetic particle clutches or other mechanical force transmitting devices employing magnetic fluids or powders, and in which magnetic flux is passed through the powder to more or less solidify it to enable it to transmit force.

One of the important applications of the magnetic powder discussed herein has been in a clutch of the type described in the Rabinow Patent No. 2,575,360, and for purposes of better understanding the present invention, it will be discussed in connection with a clutch of this type.

In clutches and other force transmitting devices heretofore known, which employ magnetic powder, there has generally been a lubricant provided in the magnetic powder such as oil, powdered graphite, mica, soapstone, potstone, steatite, French chalk, lampblack, or other organic substances or a mixture thereof.

One of the undesirable conditions often found in clutches using magnetic powder having such a lubricant is the packing or wedging of the powder between the force transmitting clutch members, i.e. the driving and driven members. This packing or wedging is apparently caused during torque transmission of the clutch by centrifugal force acting to throw the particles outwardly from the center of rotation. Packing or wedging of the powder can also be caused by vibration during storage or transporting of the clutch, and also when the clutch is standing still at the same time some other member of the clutch system remains in operation. One undesirable effect of this packing or wedging is to hold the force transmitting members together, at least temporarily, when the energizing current is off, and thereby to increase the amount of unlocking torque required, that is the torque required to separate or break away the force transmitting members.

Another undesirable effect of the wedging or packing referred to occurs when the clutch is used as a torque limiting clutch designed to slip upon reaching a predetermined torque of transmission (e.g. to protect a driving motor from overloads). The effect of the wedging is to increase the torque at which the clutch will slip to a torque exceeding the predetermined torque setting of the clutch, thereby rendering the clutch incapable of the protective function for which it was intended.

Another of the disadvantages of using a lubricant such as one of those listed above in the magnetic powder is the low thermal conductivity of these materials. This characteristic of the lubricant aggravates the problem of heat dissipation caused by friction between the particles in the powder.

It is thus an important object of this invention to overcome the disadvantages recited above by providing a flowable magnetic powder for use in mechanical force transmitting devices, which powder is less likely to become wedged or packed between the force-transmitting members than powders heretofore known.

Another object is to provide such a magnetic powder which conducts heat more readily than powders heretofore known.

Briefly stated in accordance with one aspect of the invention, a magnetic powder is provided for use in a mechanical force transmitting device consisting of a mixture of magnetic metal or alloy particles and non-magnetic metal or alloy particles and characterized by the absence of a lubricant. In another aspect of the invention, one of the metals in the powder is such as to give substantial resiliency to the powder mass as a whole.

The invention will be better understood and additional advantages and objects thereof will become apparent upon perusal of the following description taken with the drawings and the scope of the invention will be pointed out in the appended claims.

In the drawings the single figure is a sectional view of an illustrative design of a magnetic powder clutch. It comprises two independently rotatable members 10 and 11 supported in two bearings, for example, ball bearings 12, without axial thrust. These ball bearings are sealed as by gaskets 13 from the interior of the clutch. The internal rotating member 11 is of paramagnetic material and carries the flux producing winding in the form of an annular coil 15 coaxial with the shafts. Two slip rings 20 and 21 carry the energizing current which may be A.C. or D.C., to the coil 15 by leads 22 and 23.

The external rotating member 10 of the clutch comprises a hollow housing, a portion of which furnishes the magnetic return path for the coil flux, one such path being shown in dotted lines in Fig. 1. Magnetic powder 30 is disposed within the air gap between the inner rotating member 11 and the outer rotating member 10, and this powder comprises magnetic metal particles mixed with non-magnetic metal particles. Energization of the coil 15 causes the powder to more or less solidify, enabling it to transmit torque between the rotatable clutch members 10 and 11 in a manner similar to that described in the Rabinow patent mentioned above.

The magnetitc metal or alloy of the magnetic powder 30 may be iron or magnetic stainless steel or other well known magnetic metals. The magnetic powder is characterized by the absence of a lubricant, either the liquid or dry type.

Non-magnetic metals which have been successfully used in the magnetic powder 30 to satisfy the objects of this invention include aluminum and copper and alloys thereof; however, it is to be understood that the invention is not limited to these metals alone.

Improved results have been realized by using a metal in the air gap which together with the other metal makes up a powder having substantial resiliency. For this purpose titanium sponge has been successfully used. A mixture of 88% magnetic stainless steel and 12% titanium powder, e.g., was found to require an exceptionally low unlocking torque. This mixture has the additional advantage that it is non-corrosive. The resiliency of the powder made up of stainless steel and titanium sponge is believed attributable to the irregular shapes of the titanium sponge particles which renders the powder compressible and expansible. Exemplary test results of magnetic powders have been as follows. With a #410 stainless steel powder (88%) mixed with titanium sponge powder (12%), the unlocking torque required was .017 in.-lbs. With a nickel-aluminum-iron alloy powder including graphite particles, the unlocking torque required was 4.0 in.-lbs.

While a particular embodiment of the invention has been illustrated and described, modifications thereof will readily occur to those skilled in the art. It should be understood therefore that the invention is not limited to the particular arrangement disclosed but that the appended claims are intended to cover all modifications

What is claimed as new and desired to be secured by United States Letters Patent is:

1. A magnetic particle force transmitting device having a low unlocking torque comprising, a pair of relatively movable members having an air gap therebetween, means for creating a magnetic field across said air gap, and a resilient metallic powder disposed within said air gap, said powder consisting of a mixture of approximately 88% magnetic powder and approximately 12% non-magnetic titanium sponge powder.

2. A magnetic particle force transmitting device having a low unlocking torque including a metallic powder of magnetically variable shear strength, characterized by the absence of a lubricant, said powder consisting of approximately 88% magnetic metal particles and approximately 12% non-magnetic titanium sponge particles.

References Cited in the file of this patent

UNITED STATES PATENTS

| | | |
|---|---|---|
| 1,112,411 | Ackley | Sept. 29, 1914 |
| 2,205,611 | Wasserman | June 25, 1940 |
| 2,205,864 | Schwarzkopf | June 25, 1940 |
| 2,736,409 | Logan | Feb. 28, 1956 |
| 2,787,354 | Gill | Apr. 2, 1957 |
| 2,804,955 | Gill | Sept. 3, 1957 |

FOREIGN PATENTS

| | | |
|---|---|---|
| 677,726 | Great Britain | Aug. 20, 1952 |
| 526,070 | Belgium | July 28, 1954 |

OTHER REFERENCES

Transactions of AIEE, April 1953, pages 88–92, Investigations of Magnetic Mixtures for Clutch Application, Jones.